: 3,208,995
Patented Sept. 28, 1965

3,208,995
METHOD OF DEPOLYMERIZING ALGINIC ACID SALTS AND ESTERS BY REACTION WITH $NO_2$
Charles G. Dodd, Norman, and Louis Maus, Tulsa, Okla., assignors to Cherokee Laboratories, Inc., Tulsa, Okla.
No Drawing. Filed June 22, 1961, Ser. No. 118,769
6 Claims. (Cl. 260—209.6)

This invention relates to derivatives of alginic acid and more particularly to such derivatives which are capable of forming complexes with transition elements and to the complexes so formed.

One object of this invention is to depolymerize naturally occurring alginic acid or salts and esters of alginic acid.

Another object of this invention is to modify alginic acid and its salts and esters, including modification by depolymerization, so that complexes of transition elements can be readily manufactured from the modified acid, salts or esters.

Still another object is to provide transition element complexes and calcium and strontium complexes or chelates of depolymerized alginic acid and its salts.

Another object is to make complexes, particularly of iron, with depolymerized alginic acid derivatives having extremely low toxicities when injected either intravenously, subcutaneously, intraperitoneally or intramuscularly or when taken orally into most species of mammals.

Yet another object is to provide a stable, hematinic drug for intramuscular injection of mammals that has low toxicity and that causes few undesirable side effects such as excessive bleeding at the site of injection, or excessive pain.

Alginic acid, certain of its esters and its alkali-metal salts, particularly its sodium salt, all of these materials being broadly termed algins, have long been known to be non-toxic at high levels in mammals. For example, sodium alginate is a widely used food additive for thickening or "stabilizing" purposes as in the manufacture of commercial ice cream. Complexes of transition elements including iron, cobalt, manganese and copper with presently available water soluble alginates, however, are at best very difficult if not impossible to form due to the high viscosity of even dilute alginate solutions. Moreover, algins, i.e. alginic acid or salts and esters thereof, probably because of their molecular structure, are not easily depolymerized by acid or alkaline hydrolysis as are many polysaccharides such as starch. Thus, for these reasons, useful transition element complexes of alginic acid or any of its derivatives previously have not been known.

It has been discovered that algins can be chemically modified, including modification by depolymerization, to yield materials which are readily complexed with transition elements such as iron and cobalt. The chemical modification is accomplished by (1) reacting a finely divided dispersion of a water soluble salt or a lower alkyl or alkylol ester of alginic acid in a neutral liquid medium such as $CCl_4$, with 3 to 20 mols of $NO_2$ per mol of anhydro-d-mannuronic anhydride units in the algin, the reaction being carried out in the presence of ½ to 2 mols per mol of anhydro-d-mannuronic units of a lower alkyl alcohol or lower alkylene glycol if the algin is not an ester to begin with, or (2) treating a 1% to 25% by weight volume of an aqueous solution of an alginate with hydrogen peroxide in a solution concentration range of from .005 M to 0.5 M hydrogen peroxide at a temperature above 50° C. and under atmospheric or autogenous pressure up to 3 atmospheres until the viscosity of the solution is substantially reduced. The crude modified algin product of either (1) or (2) above, contains high percentages of a complexable material which is non-toxic to mammals but purification is required to eliminate toxic by-products and pyrogens. Removal of these toxins is especially effective by precipitation one or more times of the desired portions of the crude product from an aqueous alkaline solution having a pH above 9 with a lower alkyl alcohol such as isopropyl alcohol, followed by precipitation of the free modified polymer acid in aqueous solution at a pH of less than 1.0, followed by neutralization and resolution and, if desired, reprecipitation with alcohol. The precipitate can be dried and stored for future use or the solution can be complexed with transition elements, by conventional techniques.

Iron complexes prepared from the modified algins of this invention are especially useful for treatment of anemia in mammals caused by iron deficiency. The preferred minimal dosage by intramuscular injection is about 100 mg. based on iron content of an injection containing a colloidal dispersion or solution of the complex in sterile water or other suitable pharmaceutical carrier, the injection having a pH of between 6 and 8 depending upon the mammal to be treated. Dosages at least up to 250 mg. are not harmful and are more effective than 100 mg. doses if the mammal has a body weight in excess of about 30 kilograms. The iron complexes per se in the injection contain from 0.7 mol to 1.5 mols of elemental iron per mol of mannuronic anhydride units. The injectable material, i.e. the dispersion or solution of complex, thus may contain from about 2% to 10% by weight of elemental iron. These solutions or dispersions of the iron complexes can be prepared to have an acute toxicity, $LD_{50}$, of above 500 mg. per kilogram of animal weight based on iron content of the complex as observed when mice are injected intravenously with the complex solutions or dispersions.

For veterinary use of the iron complex containing injectable material, one or two 100 mg. doses based on iron in young animals overcomes a common anemia problem particularly in the case of swine. The first 100 mg. dose is given in a period from two to four days after birth of the swine, and one dose is usually sufficient. However, a second dose may be given a week to ten days or later, after the first dose, if positive symptoms of anemia occur or reoccur.

For adult human use, intramuscular injections of the iron complex of this invention containing 250 mg. of elemental iron are preferred for treatment of anemia which is responsive to iron therapy. Such doses are given at five to ten day intervals until the anemic condition is relieved. Smaller doses in the range of 100 mg. to 150 mg. are effective when employed in the same manner for pediatric use. In conjunction with intramuscular injection of iron containing materials into mammals, a cobalt containing substance may be present such as vitamin $B_{12}$. Cobalt complexes of the modified algins described herein are also useful for this purpose. While the complex per se may contain 0.7 mol to 1.5 mols of elemental cobalt per mol of mannuronic anhydride units, the dosage levels for injection are only 5 micrograms to 5 mg. based on elemental cobalt content. In veterinary use for young swine, an intramuscular injection containing 0.35 mg. of the cobalt complex calculated as elemental cobalt and 100 mg. of iron based on elemental iron content has been shown to have some advantages over an injection containing only the iron complex at the 100 mg. level. Specifically, it has been found that injection with such a cobalt iron complex results in much larger weight gains and hemoglobin gains as compared with injection of an equivalent amount of cobalt free iron complex at the time of weaning. The cobalt increases the utilization of the iron. Similarly, a 1.75 mg. dose of the cobalt complex based on elemental cobalt along with a 250 mg. dose of iron complex based on elemental iron, conveniently, in the same intramuscular injection, will provoke a better response in an adult human than the 250 mg. dose of iron alone.

Calcium complexes of the modified algins of this invention having ½ mol to 1½ mols of elemental calcium per mol of mannuronic anhydride are useful in solutions or colloidal dispersions in a liquid pharmaceutical carrier preferably sterile water, as veterinary parenteral injections to correct calcium deficiencies in animals. These deficiencies commonly occur in milk cows and are corrected by intramuscular injections of the calcium complexes in 1 g. to 3 g. doses given every 3 to 5 days until the calcium deficiency is relieved. The injection solutions or dispersions so employed conveniently may contain 1% to 8% by weight of elemental calcium.

The algins which are the starting materials for this invention are obtained from the cell walls of most species of Phaeophyceae or brown algae. An important commercial source in the United States is the giant kelp, *Macrocystis pyrifera*, which grows along the southern California coast. Other commercial sources exist in other parts of the United States and in Great Britain and Norway from the species *Laminaria cloustonia, Ascophyllum nodosum* and *Laminaria digitata* of brown algae. There is some variance in the chemical composition of the algins obtained from different sources, but the basic structure is thought to be alginic acid (or a salt thereof) which is a linear polymer of uronic acids consisting of from 40% to about 95% anhydro-d-mannuronic acid and the remainder guluronic acid, with the relative amounts of these two acids varying somewhat according to the species of brown algae from which the algin is extracted. For convenience of description in this application, whenever mols of anhydro-d-mannuronic units are referred to, this also includes the guluronic acid units in the algin molecule. The acids are believed to be joined by $\beta$-(1,4) glycosidic linkages. Various estimates have been made of the number of uronic acid units in typical algins as derived from solution viscosity data. However, commercial algins, e.g. sodium alginate, are known to have varying solution viscosities at the same concentration depending on grade or type. Thus, commercially available sodium alignates have aqueous solution viscosities at 1% by weight concentration of from about 15 cps. to about 400 cps. or more as determined in an Ostwald viscometer at 25° C. The commercial algins having the lowest available solution viscosities, however, are not suitable for making the complexes of this invention because their viscosities in solution are still much too high.

The modified depolymerized aligns of this invention in sodium salt form after being precipitated from an aqueous alkaline solution at a pH above 9 with a volume of isopropyl alcohol equal to the volume of the aqueous alkaline solution, have aqueous solution viscosities at 1% concentration by weight of less than about 1.5 cps. at 25° C., preferably less than 1.0 cps. at 25° C., i.e. approaching the viscosity of water which is 0.893 at 25° C. The intrinsic viscosity of the salt may vary between about 0.03 and 0.13. A preferred value of intrinsic viscosity is about 0.10. It is believed that the modified depolymerized algins are essentially polymers containing on the average 10 to 100 anhydro-d-mannuronic units in each molecule. Moreover, the chemical structure of the anhydro-d-mannuronic units is not substantially changed in the process of depolymerization carried out in accordance with invention since the dextro-optical rotation of the algins before and after depolymerization including the precipitation from alkaline solution, is the same ±5° of rotation.

The algins which are depolymerized as described herein are in the form of or are converted to a water soluble salt prior to depolymerization or, if depolymerization with $NO_2$ is employed, the algin may be either a water soluble salt or a lower alkyl or alkylol ester. It is to be understood that these salts and esters are formed by reaction with the carboxyl groups in the anhydro-d-mannuronic units of alginic acid. The water soluble salts employed include alkali metal alginates and ammonium alginate. Illustrative of the alkali metal salts are sodium alginate, potassium alginate and lithium alginate. The alkyl and alkylol groups of the esters contain 2 to 5 carbon atoms, examples of which groups are ethyl, propyl, isopropyl, n-butyl, n-amyl, ethylol, propylol, n-butylol and n-amylol. Of the esters, the alklene glycol esters of alginic acid are convenient because of their solubility in water being higher than that of the alkylol esters. The depolymerized modified algins of the invention are in or are converted to a water soluble salt, or ester for convenience in handling. Alkali metals, illustratively sodium, potassium and lithium, form water soluble salts of the modified algins in the same manner as of unmodified alginic acid, and these salts are preferred as being most conveniently handled.

Methods by which the modified depolymerized algins of this invention are complexed with transition elements are, as stated above, conventional. Broadly, the complexing is effected by agitating and heating a solution of the algin containing positively charged ions of a transition element, under alkaline conditions. To carry out the complexing most efficiently a water soluble transition element salt preferably of a mineral acid such as hydrochloric acid, sulfuric acid or phosphoric acid, is added incrementally to a hot, e.g. from about 60° C. to about 100° C., agitated aqueous alkaline solution of the algin with the pH of the solution maintained on the alkaline side, preferably at a pH of from about 9 to about 13. The complexes so obtained are water soluble and are stable in aqueous solution. The pH of an aqueous solution of the complex may be adjusted to as low as 4 without precipitation, and solubility is not lost in 10% by weight or more highly concentrated aqueous caustic soda solutions. However, a solution pH of less than 12 is preferred because solutions of higher pH tend to unduly degrade the modified algin itself.

The elements which form complexes with the modified depolymerized algins of this invention include calcium, strontium and the transition elements, i.e. those elements in Groups IB, IIB, IIIB, IVB, VB, VIB, VIIB and VIII of the Periodic Table. The transition elements of groups IB, IIB, IVB, VB, VIB, VIIB and VIII are the most important and therefore preferred including copper, silver, gold, zinc, cadmium, mercury, titanium, zirconium, hafnium, thorium, vanadium, columbium, tantalum, chromium, molybdenum, tungsten, uranium, manganese, iron, cobalt and nickel. Metals which follow the transition elements in the Periodic Table also can be complexed with the modified algins. Illustrative of these metals are tin, antimony, bismuth and lead. In addition to using the complexes of this invention to supply physiologically useful doses of certain elements as noted above, for instance the iron, cobalt, and calcium complexes, a complex of strontium with depolymerized algin is useful for the removal of strontium, particularly strontium-90, from the vascular system.

Utility of the modified depolymerized algins per se, is illustrated with respect to their ability to chelate iron and calcium ions. Thus, a 0.5% by weight aqueous solution of the modified algin in sodium salt form, can be used as a rinse in commercial bottle washing operations to prevent haze or scum formation on the bottles. Conveniently, the modified algins are added to a 5% to 10% by weight caustic soda solution which is used for bottle washing.

The ferric iron complexes of the modified depolymerized algins of this invention appear to be the most commercially important complexes of those described herein. Therefore, several alternative methods of preparations will be discussed. First, an aqueous solution of a water soluble ferric salt, e.g. ferric chloride, ferric sulfate or ferric acetate, is added in increments over a period of time, ½ to 3 hrs., to a solution of the modified alginate containing at least sufficient alkaline reacting material such as sodium hydroxide, sodium carbonate, potassium hydroxide or lithium hydroxide, so that all of the ferric salt added theoretically could be converted to ferric hydroxide. The amount of ferric salt added is such to supply up to 1.5 mols of ferric iron per mol of anhydro-d-mannuronic units in the algin, and as a practical lower limit at least 0.7 mol of ferric iron per mol of said units should be supplied. The solution is well agitated during the addition of the ferric salt and heated from about 60° C. to the boiling point of the solution. Secondly, the same procedure and amounts are followed as in the first given method of complexing ferric iron except that the alkaline reacting material is added step-wise, i.e. 2 or 3 times during the addition of ferric salt. Thirdly, the same amount of the ferric salt may be added to the algin solution then the alkaline reacting material added and the solution heated at 60° C. to boiling for 1 to 3 hours with agitation. Fourthly, the same required amount of the ferric salt is added to a solution containing a sufficient amount of the alkaline reacting material to form a basic ferric salt having two hydroxyl groups for each ferric atom, e.g. $Fe(OH)_2Cl$. The basic ferric salt is then added all at once or in increments to an aqueous solution of the modified algin with heating at 60° C. to 100° C. and agitation over a period of time of from about 1 to about 3 hours.

A further embodiment of this invention relates to the preparation of ferric alginate. Ferric alginate is reported in the literature to be an insoluble compound and therefore has heretofore been unsuitable as a therapeutic agent. It has now been found that a new form of ferric alginate may be prepared by the reaction of a water soluble ferric salt, e.g. ferric chloride, ferric sulfate or ferric acetate, with the modified depolymerized algins of this invention at a pH below about 4. Since only ⅓ mol of the ferric salt reacts per mol of the modified algin, it is not necessary to use larger molar amounts of the ferric salt as is the case when preparing ferric complexes of the modified algin. In performing the reaction, several alternative methods may be used. First, an aqueous solution of the water soluble ferric salt may be added in increments over a period of from ½ to 3 hours to a solution of the modified algin which has been acidified to a pH below about 4. As above mentioned, ferric salt should be used in an amount sufficient to provide at least ⅓ mol of ferric iron per mol of anhydro-d-mannuronic units. Alternatively, the solution of ferric salt may be added batchwise to the acidified solution of modified algin. It is not necessary to heat the solution to cause the ferric salt to react with the modified algin although the formation of ferric alginate may be hastened by heating. As the reaction proceeds, ferric alginate is precipitated. The product may be recovered by filtration and purified by successive washings and/or recrystallization. The resultant ferric alginate is insoluble in water at a pH below about 4. However, unlike ferric alginate previously known, when the pH is elevated to above 4–5, the soluble ferric complex is formed which has been previously described. This unique property makes the ferric alginate produced extremely valuable as a therapeutic agent, particularly for the treatment of iron deficiency anemia by means of oral administration. It is known that the pH of the stomach fluids is in the range of 1 to about 2.5 and that currently available oral iron preparations tend to liberate free ferrous and ferric ions at this low pH range, thus producing nausea in the patient. However, the ferric alginate produced in accordance with this invention is insoluble at the pH range of the stomach fluids and iron ions are not liberated and there is therefore no resultant nausea or corrosion of the stomach tissues. As the insoluble ferric alginate passes into the intestines, the pH of the surroundings increases to about 4 at the point of entry and to as high as 8.5 in various parts of the intestine. In this pH range, the ferric alginate is converted to the water soluble ferric complex of the modified algin which is itself non-toxic and non-corrosive. The iron content of the complex is released by enzymatic action on the algin portion of the ferric complex. It has been found that much larger doses of available iron may be administered orally by the use of ferric alginate prepared as described above than can be administered by iron preparations presently on the market. The best material presently available for oral administration is ferrous fumarate. In dogs, ferrous fumarate will produce vomiting in 50 percent of the dogs tested at an iron dosage rate of 250 mg./kg. of animal weight. However, by the use of the ferric alginate produced according to this invention, iron dosages of 700 mg./kg. of animal weight did not produce vomiting in any of the dogs tested.

In the preparation of complexes containing both iron and small amounts of cobalt we have found that the pH of the solution should be less than 8.0 to 8.5 before adding the cobalt salt and thereafter the pH should not be allowed to rise above this limit. With each metal the appropriate pH limits depend on the relative strength of the complex formed and the solubility of the respective hydrous oxide.

It has been found that certain precautions and purification steps are important in the preparation of both the modified depolymerized algins of this invention and the complexes formed from these algins. Precipitation of the modified algins with a lower alkyl alcohol from an aqueous alkaline solution has been outlined above. This procedure apparently removes most if not all of the by-products of side reactions in depolymerization effected by either $NO_2$ or hydrogen peroxide as described herein. In the case of $NO_2$ depolymerization, the modified product must first be removed from the liquid reaction medium which is a non-solvent for the product and does not enter into any of the reactions carried out. Such non-solvents include carbon tetrachloride, trichloroethylene, perchloroethylene and the like and other inert solvents such as dimethyl sulfoxide. Removal is conveniently accomplished by filtration and washing the product with a lower alkyl alcohol such as isopropyl alcohol. The filtered and washed product may be dried and weighed to determine yield and then dissolved or without drying dissolved in an aqueous alkaline solution having a pH of from about 9 to 12, such as of caustic soda. The solution is filtered and to the filtrate is added about one to one and a half volumes of a lower alkyl alcohol which causes precipitation of the modified algin. The lower alkyl alcohols used for washing and precipitation have 1 to 6 carbon atoms and include methyl alcohol, ethyl alcohol, n-propyl alcohol, isopropyl alcohol, n-butyl alcohol, n-amyl alcohol and n-hexyl alcohol. The precipitation from an aqueous alkaline solution may be repeated one or more times and it is preferable to filter the solution each time before precipitation. A filter medium capable of removing bacteria also is preferred for this purpose. If the modified algin is made by the described treatment with hydrogen peroxide, the product is already in aqueous solution having a pH of about 5. Thus, the pH is merely raised to from about 9 to 12, for example, by addition of caustic soda, and precipitation of the modified algin is effected by addition of a lower alkyl alcohol as described for the product of the $NO_2$ depolymerization after dissolution. After one or more precipitations from aqueous alkaline solution, the precipitate can be dissolved or partially dissolved in water and further purified by adjusting the pH of the solution to from about 1.5 to about 6, preferably from 3.5 to 5. Alternatively, the pH may be reduced to as low as 0.5 to precipitate free acidic polymer. This removes undesirable low molecular weight by-products. The pH is preferably adjusted by adding HCl to the solution. To the acidified solution is then added 1 to 1½ volumes based on the volume of the solution, of a lower alkyl alcohol to precipitate the modified algin in substantially the same manner as the alkaline solutions are precipitated. Also, prior to the alcohol precipitation of the acidic solution, the solution is preferably filtered. After the final precipitation from either an alkaline or acidic solution the precipitated product can be dried and stored or immediately redissolved for carrying out complexing in accordance with this invention. Another method for processing the depolymerized algin involves fractionation of the algin from a saturated solution thereof to exclude higher molecular weight fractions. By this method, a solution of depolymerized algin is evaporated to form a saturated solution. Evaporation is then continued until some algin precipitates. The precipitated algin has a higher molecular weight than the algin that remains in the mother liquor. It is preferred to carry out this fractionation to an extent sufficient to provide an algin fraction which will form a solution in water at room temperature. Another method for fractionation of the depolymerized algin involves the addition of sufficient alcohol to precipitate out of the solution only a portion of the total algin content. Higher molecular weight fractions of the algin are thereby precipitated from the solution. Following the complexing procedure, the complex containing solution is cooled and filtered. Optionally, the filtered complex solution may be treated with an equal or greater volume of a lower alkyl alcohol to precipitate the complex. A large portion of the NaCl formed during the reaction may be removed from the precipitated complex by this method. The precipitated complex is then redissolved in water. The complex solution is effectively purified from undesirable by-products of the complexing procedure by dialysis wherein the pH of the complex solution is first adjusted to from about 6 to about 8 and separated from a flow of tap water or, preferably, demineralized water or distilled water by a dialysis membrane such as a regenerated cellulose pellicle 1 to 3 mils in thickness. This dialysis treatment is continued over a period of time of the order of from 15 to 30 hours. The dialyzed complex solution is filtered through a diatomaceous earth filter or a filter capable of removing bacteria, two to four times. The complex is evaporated so as to contain from about 1% to about 10% by weight of the element or elements complexed. The particular concentration by weight of the element will depend on the nature of the element and the use for which it is intended. Finally, the pH of the concentrated complex solution is adjusted for the particular use desired. It is further pointed out that adequate precautions to prevent contamination should be taken in all stages of manufacture of the modified algins or complexes thereof if a pharmaceutical end use is desired. Such precautions include sterilizing all equipment and using sterile water, preferably distilled, in all operations.

The following working examples illustrate the invention and set forth the best mode contemplated by the inventors of carrying out their invention.

*Example 1*

100 grams of commercial sodium alginate were suspended in 3500 ml. of water. The material was agitated intensely with a mechanical agitator, and 8 ml. of hydrogen peroxide, 30% by weight concentration, were added. Heat was applied so that the temperature rose from room temperature to 50° C. in an hour, and the material continuously agitated. Further heat was applied over a 3½ hour period until the temperature reached 90° C. 1000 ml. of water were evaporated during this period. The color of the material is then reddish amber and a pH reading indicated 4.5 to 5.0. One-half of the resulting solution was placed in a 4 liter beaker and a volume of isopropyl alcohol equal to the volume of the solution was added. A flocculent white precipitate formed under a reddish supernatant layer. After decanting, 900 ml. of water were added to the white precipitate. Sufficient 3 N sodium hydroxide was added to raise the pH to about 10 to 12. This material was filtered and a small amount of precipitate retained on the filter was discarded. The filtrate contained a relatively pure modified depolymerized algin in sodium salt form having an aqueous solution viscosity at a concentration of 1% by weight of 1.2 cps. at 25° C. and an intrinsic viscosity of 0.10. The filtrate containing the modified algin was heated with 10 grams of added sodium hydroxide. 20 grams of ferric chloride hexahydrate then were added as a water solution with agitation. The temperature was maintained at 90 to 95° C. Five grams of sodium hydroxide were added followed by 10 grams of ferric chloride hexahydrate in water solution. Another 5 grams of sodium hydroxide were added and then 10 grams of ferric chloride hexahydrate in solution. Enough sodium hydroxide was added to elevate the pH of solution to 13, and the solution was boiled gently for 15 minutes. This solution contained a ferric iron complex of the modified depolymerized algin containing 1 mol of elemental iron for each mol of anhydro-d-mannuronic units in the modified algin. The solution was evaporated to about 5% by weight of iron and two volumes of isopropyl alcohol were added to precipitate the complex. The alcohol layer was separated by decantation and discarded. The precipitate was then reconstituted wtih water to produce a 10 percent by weight solution. The solution of iron complex so formed was dialyzed for 24 hours against tap water employing a regenerated cellulose membrane of 3 mils in thickness. The dialyzed solution was evaporated so as to contain 5% by weight of ferric iron. The concentrated solution was filtered twice through a diatomaceous earth filter and bottled in a sterile container. The complex containing solution was tested for acute toxicity by intravenous injection into mice. The results indicated an $LD_{50}$ of 950 to 1000 mg. of iron per kilogram of test animal weight. Intramuscular injection of a single 100 mg. dose based on iron content to each of a series of three-day old swine indicated satisfactory anti-anemia response without observation of any undesirable side effects, including excessive bleeding at the site of injection.

*Example 2*

One hundred and fifty grams of commercial sodium alginate, 114 ml. of isopropyl alcohol and 356 ml. of carbon tetrachloride were slurried together in a Waring blender and then placed in a 2-liter 3-necked flask; 485 ml. of carbon tetrachloride were added to the flask. One hundred and fifteen ml. of carbon tetrachloride were mixed separately with 160 ml. of nitrogen dioxide. This mixture was placed in a separatory funnel arranged to feed into the flask through one of its outlets. The mixture was incrementally fed to the flask over a 35 minute period, adjusting the rate of feed so that the temperature in the flask did not exceed 49° C. The contents of the flask were permitted to react with agitation for 18 hours. The reaction mixture was filtered, the filtrate having a light orange-red color. The filtrate was discarded and the residue on the filter retained. A one-third portion by weight of the residue was added to 500 ml. of a 5% by weight solution of sodium hydroxide, and a dark red solution was formed upon continued stirring. A volume of isopropyl alcohol equal to the volume of solution was added and a heavy oil-like layer formed below a layer containing the alcohol. The alcohol layer was decanted and discarded. The oil-like layer was dissolved in 300 ml. of water . This solution was adjusted to a pH of 4 with hydrochloric acid. An equal volume of isopropyl alcohol was added to the solution to form a white precipitate. The precipitate was filtered out and retained. The precipitate was essentially a depolymerized algin in sodium salt form and had an aqueous solution viscosity at 1% by weight concentration of 1.1 cps. at 25° C. The precipitate was dried and the resultant mass was a fine free-flowing powder which was completely stable at room temperature over an extended period of time. Twenty-five grams of the dried precipitate were suspended in 100 ml. of water and 10 grams of sodium hydroxide in 150 ml. of water were added to the suspension. A solution was formed, and 20 grams of ferric chloride hexahydrate were added slowly to the solution which had been heated to 90° C. The addition was made over a 1½ hour period. The pH of the solution was then adjusted to 7, and it was dialyzed for 18 hours against Norman, Oklahoma, tap water using a regenerated cellulose membrane having a thickness of 3 mils. Following dialysis the solution was evaporated to ½ volume, adjusted for pH to from 6.0 to 6.5 and filtered through a diatomaceous earth filter. The solution was further evaporated to contain 5% by weight of ferric iron and bottled in a sterile container. This iron complex containing solution was tested for acute toxicity by intravenous injection of mice and was found to have an $LD_{50}$ of 1000 to 1050 mg. of iron per kilogram of test animal weight.

*Example 3*

Five hundred grams of commercial sodium alginate were slurried into 1300 ml. of carbon tetrachloride in a reaction vessel. There were then added, batchwise with stirring, 600 ml. of nitrogen dioxide in 600 ml. of carbon tetrachloride. The temperature within the reaction vessel dropped slightly as the nitrogen dioxide was added. After three hours, 380 ml. of isopropyl alcohol were incrementally added to the vessel over a 90 minute period. The mixture was allowed to react overnight. It was then filtered and the precipitate was washed with isopropyl alcohol and air dried. This product was added to 2 liters of 1 N NaOH and an orange colored solution was formed. After stirring for about 5 hours, an excess volume of isopropyl alcohol was added to precipitate the product. The sodium salt of the depolymerized algin was then resuspended in about 3 liters of water using a Hamilton Beach mixer and the pH was adjusted to about 2 by the addition of concentrated HCl. To the acid solution, there was then added an equal volume of acetone and the mixture was stirred vigorously and subsequently filtered. The filtrate was discarded. The precipitate was washed with acetone and air dried. The product was in the form of hard, brown lumps. One hundred fifty grams of the product were slurried in 1500 ml. of demineralized water. To this there were added slowly with mixing 150 grams of ferric chloride hexahydrate in a 750 ml. aqueous solution. After approximaetly one hour of heating at about 90° C., the pH of the mixture was adjusted to 9 by the addition of 3 N NaOH. The ferric complex began forming as soon as the pH reached 7. After 4 hours of heating at between 65 to 70° C., the stable complex had completely formed. The pH of the solution was then adjusted to approximately 7. It was then dialyzed overnight against tap water. The solution was then evaporated to bring the total ferric iron content to 5% by weight of the solution and was then bottled in a sterile container. This iron complex was effective in the treatment of iron deficiency anemia in swine.

*Example 4*

25 grams of the dried modified depolymerized algin prepared in Example 2 were suspended in 150 ml. of water and the pH was adjusted to about 7.5 by the addition of NaOH. A solution formed as the mixture was heated to 90° C. 17 grams of cobaltous chloride hexahydrate were added to the solution over a 2 hour period with agitation while the temperature was maintained at from 90° C. to 95° C. A cobalt complex of the modified algin was so formed in aqueous solution. The pH of this solution was adjusted to 7 and dialyzed against distilled water for 24 hours using a regenerated cellulose membrane having a thickness of 3 mils. The solution was evaporated to ½ volume, adjusted for pH from 6.0 to 6.5 and filtered through a diatomaceous earth filter. This was further evaporated to contain 1% by weight of cobalt and bottled in a sterile container. To 1 part by weight of the iron complex prepared in Example 2 was added 1/50 part by weight of the cobalt complex solution prepared in this example. The $LD_{50}$ of this mixture was found to be 1000 to 1050 mg. of iron and cobalt combined per kilogram of test animal weight as determined by intravenous injection of mice. This mixture of the cobalt and iron complexes also gave satisfactory anti-anemia response in a series of three-day-old swine each receiving a single dose containing 100 mg. of elemental iron and 2 mg. of elemental cobalt.

*Example 5*

Another 25 grams of the dried modified depolymerized algin prepared in Example 2 were complexed with 11 grams of anhydrous calcium chloride as described in Example 4 including the purification steps of dialysis and filtration, pH adjustment and concentration to contain 2% by weight of elemental calcium. The $LD_{50}$ of this complex in aqueous solution as determined by intravenous injection of mice was found to be in excess of 2000 mg. of calcium per kilogram of test animal weight. The calcium complexes are very useful for the treatment by injection of milk fever in dairy cows.

*Example 6*

150 grams of sodium alginate, 114 ml. of isopropyl alcohol and 386 ml. of carbon tetrachloride were slurried together in a blender and the suspension transferred to a 2-liter 3-necked flask. Over a period of 1 hour and 50 minutes, a mixture of 136 ml. of carbon tetrachloride and 114 ml. of nitrogen dioxide were added to the flask with agitation. The rate of addition was controlled to maintain the temperature in the flask below 40° C. All materials were kept in the flask for 20 hours for continued reaction. The reaction mixture was filtered and the residue retained on the filter washed with isopropyl alcohol. One-half by weight of the residue was added to 300 ml. of a 5% by weight aqueous solution of sodium hydroxide, and the mixture was stirred and mildly heated for 30 minutes. A solution resulted which was filtered. A small amount of insoluble residue was retained on the filter and was discarded. To the filtrate was added an equal volume of isopropyl alcohol, and a curdy yellowish white precipitate formed. The solution was decanted from the precipitate so formed and 750 ml. of water was added. The pH of the resultant solution was adjusted to 5. An equal volume of isopropyl alcohol was again added to precipitate a gum-like material. The alcohol containing solution was decanted off and discarded, and the gum-like material was redissolved in 200 ml. of water. Five hundred ml. of isopropyl alcohol were added to this solution to reprecipitate the gum-like material. The gum was then redissolved in 200 ml. of water. The gum was reprecipitated a second time with an equal volume of isopropyl alcohol. The gum or gum-like material was a modified depolymerized algin in sodium salt form having a 1% by weight aqueous solution viscosity of 1.1 cps. at 25° C. Ten grams of the gum were then dissolved in 40 ml. of water and the pH of the solution was adjusted to 10 with sodium hydroxide. The solution is heated to 90° C., whereupon, 8 grams of ferric chloride hexahydrate were added as a water solution with stirring. The addition is made over a 30-minute period while the temperature is maintained at from 90° C. to 95° C. The result was an aqueous solution of a ferric iron complex formed with an algin modified by depolymerization with nitrogen dioxide as described. The solution of iron complex was dialyzed against tap water for 18 hours employing a regenerated cellulose membrane, 3 ml. in thickness. The dialyzed solution is evaporated to one-half volume, its pH adjusted to from 6.0 to 6.5 and filtered through a diatomaceous filter. The complex containing solution was further evaporated so that it contained 5% by weight of ferric iron and was bottled under sterile conditions. This solution of iron complex exhibited an $LD_{50}$ of 950 to 1000 mg. of iron per kg. of test animal weight when injected intravenously into mice.

*Example 7*

Ten grams of the gum or gum-like material which was twice reprecipitated in Example 6 (modified depolymerized algin in sodium salt form) were dissolved in 40 ml. of water and the pH of the solution adjusted to 10 with sodium hydroxide. 4 grams of anhydrous zinc chloride were then added as a water solution over a 30-minute period with constant stirring and maintaining a temperature of from 90° C. to 95° C. An aqueous solution resulted of a zinc complex of the modified depolymerized algin.

*Example 8*

A nickel complex in aqueous solution of the modified depolymerized algin prepared in Example 6 was made as described in Example 7 starting with 10 grams of the modified algin except that 7 grams of nickel chloride hexahydrate were employed instead of the zinc chloride.

*Example 9*

An antimony complex in aqueous solution of the modified depolymerized algin prepared in Example 6 was made as described in Example 7 starting with 10 grams of the modified algin except that 4 grams of antimony trichloride were used instead of the zinc chloride.

*Example 10*

A manganese complex in aqueous solution of the modified depolymerized algin prepared in Example 6 was made as described in Example 7 starting with 10 grams of the modified algin except that 4 grams of manganese trichloride were used instead of zinc chloride.

*Example 11*

The process of Example 7 was repeated with the sole exception that 4 grams of strontium chloride were substituted for anhydrous zinc chloride. The depolymerized algin strontium complex was useful for the removal of strontium-90 from the vascular system in human therapy.

*Example 12*

10 grams of the twice reprecipitated modified depolymerized algin prepared in Example 6 were dissolved in 100 ml. of water, and the pH of the solution was adjusted to 10 with sodium hydroxide. 1 gram of strontium chloride ($SrCl_2$) was added to the solution. After 24 hours standing at room temperature all of the strontium had formed a complex or chelate with the modified algin.

*Example 13*

150 grams of sodium alginate were suspended in 800 ml. of carbon tetrachloride, and the mixture was placed in a reaction flask. 57 ml. of isopropyl alcohol were added to the flask. 140 ml. of nitrogen dioxide were added separately to 100 ml. of carbon tetrachloride. The mixture of nitrogen dioxide and carbon tetrachloride was added to the flask at such a rate that the temperature of the resulting reaction does not exceed 40° C. After 22 hours of reaction the solids were filtered from the reaction mixture and washed with isopropyl alcohol. One-third by weight of these solids was dissolved in 500 ml. of 5% by weight aqueous sodium hydroxide solution. An equal volume of isopropyl alcohol was added to the solution resulting in the precipitation of a gum-like material. The alcohol containing solution was decanted off and the gum-like material reconstituted, i.e. redissolved with water, and the pH of the solution adjusted to 4. Another equal volume of isopropyl alcohol was added to this acidified solution resulting in a gum-like precipitate which is separated and air-dried. The precipitate was a modified depolymerized algin in sodium salt form having a 1% by weight aqueous solution viscosity of 1.1 cps. at 25° C. Twenty-five grams of the dried gum-like material was suspended in 100 ml. of water and 12 grams of sodium hydroxide added. A solution formed as the mass was heated to 85° C. Then, 20 grams of ferric chloride hexahydrate as a water solution were added over a period of 1½ hours while maintaining a temperature of from between 85° C. and 90° C. A ferric complex in aqueous solution was so prepared and its concentration was adjusted to contain 5% by weight of iron. The complex containing solution was filtered and bottled under sterile conditions. The $LD_{50}$ of this solution was found to be 700 mg. of iron per kg. of test animal weight when injected intravenously into mice.

*Example 14*

One hundred grams of the dried gum-like material prepared as described in Example 13 was suspended in 400 ml. of water and filtered. The water soluble portion was discarded and the water insoluble portion retained on the filter was washed with water and dried. Twenty-five grams of this water soluble material were complexed in the same manner as the 25 grams of the dried gum set forth in Example 13 was complexed, i.e. using 12 grams of sodium hydroxide and 20 grams of ferric chloride hexahydrate. The complex was dialyzed as described in Example 2 and its pH adjusted to from 6.0 to 6.5 and filtered. This solution was concentrated by evaporation to contain 5% by weight of ferric iron and bottled under sterile conditions. The $LD_{50}$ of this material was 610 mg. of iron per kg. of test animal weight when injected intravenously into mice.

*Example 15*

The procedure described in Example 1 for making a solution of an iron complex in sterile water containing 5% by weight of ferric iron was repeated except that 2 kilograms of the commercial sodium alginate were used as the starting materials and the amounts of the materials employed proportionally increased. 250 mg. doses based on ferric iron content were injected intramuscularly into a number of adult humans. Each person was injected with a series of 6 doses spaced at 7 day intervals. Satisfactory responses were observed where diagnosis indicated iron-deficiency anemia prior to treatment. Satisfactory and in some cases better response was observed where the same series of injections were given to a group of adult humans where the injections contained in addition to 250 mg. of iron, 5 mg. of cobalt.

*Example 16*

Four liters of demineralized water were heated to approximately 70 to 90° C. in a Pyrex glass beaker and 100 ml. of 30% hydrogen peroxide were added. One hundred grams of commercial sodium alginate were added and the reaction mixture was heated to about 50° C. The pH of the mixture was maintained at between 5 and 7 during the reaction. The mixture was then cooled and the depolymerized algin was precipitated by the addition of an equal volume of isopropyl alcohol. After the precipitate had settled, the liquid portion was decanted and discarded. The precipitate was redissolved in demineralized water and the pH raised to 9 to 10 by the addition of NaOH. The solution was filtered to remove insolubles and high molecular weight material and the precipitate was discarded. The depolymerized algin was then precipitated by the addition of an equal volume of isopropyl alcohol. After the precipitate settled, the supernatant isopropyl alcohol was decanted and discarded. The precipitate was redissolved in demineralized water and the pH lowered to about 1.0 by the addition of HCl. Free depolymerized alginic acid slowly precipitated as a fluffy mass. The precipitated acid was collected by filtration and washed with acidified water. The filter cake was slurried in demineralized water in a flask and NaOH was added to attain a pH of about 3. A solution of one equivalent, i.e., ⅓ mol of ferric chloride hexahydrate per mol of depolymerized algin in sodium salt form was added with stirring. A brown precipitate of ferric alginate was formed. The pH of the mixture was adjusted to about 2.5 and the precipitate was collected on an acid resistant filter and washed with demineralized water. The ferric alginate was then slurried with demineralized water in a glass vessel and the pH was adjusted to about 7.5 by the addition of NaOH. A clear solution was formed which was heated for about 45 minutes and the pH adjusted to about 9.5. Subsequently, the pH was adjusted to about 7.0 and a solution of cobalt chloride hexahydrate was added slowly with stirring in an amount sufficient to provide approximately 1 part cobalt per 300 parts of iron. The solution was heated for about 45 minutes, cooled and dialyzed against demineralized water. It was then evaporated to attain a concentration of about 2.5% iron and about 17% by weight of total solids. The pH was adjusted to about 7.0 and the sample was bottled and autoclaved. It was useful in the treatment of anemia by oral administration and did not produce any nausea in iron dosages of 700 mg. per kg. of body weight.

*Example 17*

Forty pounds of depolymerized sodium alginate solids prepared as described in Example 2 were dissolved in sufficient water in a glass vessel to make an approximately 10 percent solution. The solution was acidified with 6 N HCl to a pH of about 0.5. There were then added 18.2 pounds of ferric chloride hexahydrate and the pH was adjusted to about 2.8. A precipitate of ferric alginate was formed which was collected on an acid resistant filter and the filtrate was discarded. The precipitate was washed with distilled water and transferred to a glass vessel. The product was very effective for oral administration in the treatment of anemia.

We claim:
1. A process for making a depolymerized algin which comprises reacting an algin selected from the group consisting of water soluble salts of alginic acid, lower alkyl esters of alginic acid and lower alkylol esters of alginic acid with $NO_2$ in an inert, non-aqueous, non-solvent for said depolymerized algin until substantial depolymerization is effected.

2. A process for making a depolymerized algin which comprises reacting a water soluble alginate with $NO_2$ in the presence of at least about ½ mol per mol of anhydro-d-mannuronic units in the alginate of an alcohol selected from the group consisting of a lower alkylol and a lower alkylene glycol, until substantial depolymerization is effected.

3. The process of claim 2 wherein the reaction is carried out with at least about 3 mols of $NO_2$ per mol of anhydro-d-mannuronic units in the alginate.

4. The process of claim 2 wherein the water soluble alginate is an alkali-metal salt of alginic acid.

5. A process for making a depolymerized algin which comprises reacting an algin selected from the group consisting of a lower alkyl ester of alginic acid and a lower alkylol ester of alginic acid with at least about 3 mols of $NO_2$ per mol of anhydro-d-mannuronic units in the algin, said reaction being conducted in an inert, non-aqueous, non-solvent for said depolymerized algin.

6. The process of claim 5 wherein the algin is a propylene glycol ester of alginic acid.

References Cited by the Examiner
UNITED STATES PATENTS

| | | | |
|---|---|---|---|
| 1,162,926 | 12/15 | Ingham | 260—209.6 |
| 2,496,797 | 2/50 | Kenyon et al. | 260—209.6 |
| 2,612,498 | 9/52 | Alburn | 260—209.6 |
| 2,638,469 | 5/53 | Alburn | 260—209.6 |
| 2,665,211 | 1/54 | Roland | 260—209.6 |
| 2,686,798 | 8/54 | Gmitter | 260—429 |
| 2,782,190 | 2/57 | Fischer et al. | 260—209.6 |
| 2,816,060 | 12/57 | Carter | 167—68 |
| 2,820,740 | 1/58 | London et al. | 167—68 |
| 2,848,469 | 8/58 | Kroll et al. | 260—429 |
| 2,895,910 | 7/59 | Merton et al. | 260—209.6 |
| 2,943,100 | 6/60 | Holstein | 260—429 |
| 2,983,722 | 5/61 | Horowitz et al. | 260—209.6 |
| 3,074,927 | 1/63 | Saltman et al. | 260—209 |

FOREIGN PATENTS

| | | |
|---|---|---|
| 25,187 | 1905 | Great Britain. |

OTHER REFERENCES

Chaberek et al.: Organic Sequestering Agents, John Wiley and Sons, New York (1959), chapter 8 (sections 8.17 and 8.18, pages 483–496 cited).

Stanford: "The Journal of the Society of Chemical Industry," vol. 5, April 29, 1886.

Parkinson: The Limited Oxidation of Cellulose with $NO_2$ in $CCl_4$, a review of TAPPI 41, No. 11, 661–668 (1958); appearing in The Borohydrides in Cellulose and Sugar Chemistry, available from Metal Hydrides Inc., Beverly, Mass., page 4 (1959).

Pecksock et al.: The Gluconate Complexes, J.A.C.S., vol. 77, No. 1 (1955), pages 202–206.

Martell et al.: Chemistry of the Metal Chelate Compounds, Prentice-Hall, New York (1954), Appendix I, pages 514–561 (541–544 cited).

WILLIAM H. SHORT, *Primary Examiner.*

A. H. WINKELSTEIN, FRANK C. CACCIAPAGLIN, JR., JAMES A. SEIDLEDK, LEON J. BERCOVITZ, *Examiners.*